United States Patent Office 3,316,252
Patented Apr. 25, 1967

3,316,252
6-METHYL-6-DEHYDRO DERIVATIVES
OF CORTICAL HORMONES
Howard J. Ringold, Mexico City, Mexico, assignor to Syntex S.A., Mexico City, Mexico, a corporation of Mexico
No Drawing. Filed July 8, 1959, Ser. No. 825,662
Claims priority, application Mexico, Feb. 28, 1959, 53,821
22 Claims. (Cl. 260—239.55)

The present invention relates to cyclopentanophenanthrene derivatives.

More particularly, the present invention relates to novel 6-methyl-6-dehydro derivatives of cortical hormones, having potent cortical hormone activity. The following formula illustrates the novel compounds:

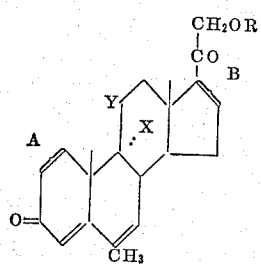

wherein A represents a single or a double bond, Y represents a keto or β-hydroxyl group, X is selected from the group consisting of hydrogen, fluorine and chlorine, B represents one of the 16α,17α-dihydroxy, 16α-acyloxy-17α-hydroxy, 16α-methyl-17α-hydroxy or 16β-methyl-17α-hydroxy groupings, or a cyclic ketal or acetal at C-16α, 17α; R represents hydrogen or a hydrocarbon carboxylic acid acyl group of up to 12 carbon atoms, saturated or unsaturated, mono- or di-carboxylic, of straight, branched, cyclic or mixed straight (branched)-cyclic chain and/or may have attached to one or more carbon atoms of its chain elements such as nitrogen or sulfur; furthermore, such acyl groups may be substituted with groups such as hydroxy, acyloxy (of up to 12 carbon atoms), alkoxy (of up to 8 carbon atoms), amino, nitro or halogen (fluorine, chlorine or bromine); typical such esters are the acetate, propionate, butyrate, hemisuccinate, enanate, caproate, benzoate, trimethylacetate, methoxyacetate, aminoacetate, aminopropionate, glycolate, chloroacetate, β-chloroacetate, β-chloropropionate, trifluoroacetate, stearate, phenylpropionate, cyclopentylpropionate and furancarbonate; or by refluxing with collidine; furthermore, R may also represent an acyl group deriving from sulfonic acids, phosphoric acids, sulfuric acid or from hydrogen halides, or an acyl group which renders the compound water-soluble, such as the alkali metal and alkaline earth salts of dicarboxylic acids, the disodium salts of phosphates or the hydrohalides of aminoacetates.

The ketals and acetals are represented by the following schematical formula:

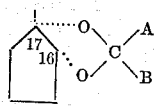

wherein A and B represent hydrogen atoms or residues of aliphatic hydrocarbons (of up to 8 carbon atoms), aromatic hydrocarbons or mixed aliphatic-aromatic hydrocarbons.

The following equation illustrates a process for preparing the novel compounds of the present invention:

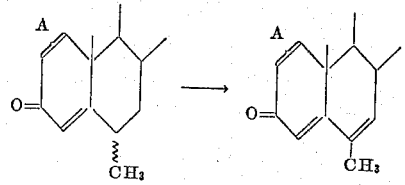

In practicing the process as above set forth, a 6-methyl-$\Delta^4$-3-ketone or 6-methyl-$\Delta^{1,4}$-3-ketone was treated with a quinone of appropriate oxidation-reduction potential, preferably with tetrachlorobenzoquinone (chloranil) to produce the 6-methyl-$\Delta^{4,6}$-3-ketone or 6-methyl-$\Delta^{1,4,6}$-3-ketone respectively. The latter was also obtained by reaction of the 6-methyl-$\Delta^{4,6}$-3-ketone with selenium dioxide.

For converting a 6-methyl-$\Delta^4$-3-ketone into the 6-methyl-$\Delta^{4,6}$-3-ketone, the former was refluxed with chloranil in mixture with ethyl acetate and acetic acid; the same reaction effected the conversion of a 6-methyl-$\Delta^{1,4}$-3-ketone into the respective 6-methyl-$\Delta^{1,4,6}$-3-ketone, which was equally obtained by refluxing the 6-methyl-$\Delta^4$-3-ketone with chloranil in mixture with n-amyl alcohol; for dehydrogenating a 6-methyl-$\Delta^{4,6}$-3-ketone to the 6-methyl-$\Delta^{1,4,6}$-3-ketone, it was refluxed with selenium dioxide in ter-butanol in the presence of catalytic amount of pyridine. The hydroxyl group at C-21 of the starting compounds was preferably esterified; the hydroxyl group at C-16α, if any, was also preferably esterified. The hydrolysis of such ester groups, the reesterification at C-21, and in its case also at C-16, as well as the hydrolysis of the ketal or acetal group at C-16α,17α, were effected by conventional methods. The acetal or ketal groups may be introduced into the novel 16,17-dihydroxy-6-methyl-$\Delta^{4,6}$-3-ketones prepared in accordance with the process hereabove set forth.

Said process is subject to many modifications, such as for example; the introduction of the double bond at C-6,7 can be effected by reaction with chloranil in mixture with xylene; instead of chloranil, bromanil can be used; in the reaction with selenium dioxide the pyridine can be substituted by another basic catalyst, such as collidine, or the reaction can be carried out in acetic acid without a catalyst; the methyl group at C-6 of the starting compounds may be in the α or in the β position; alternatively, a 6-methyl-$\Delta^{1,4}$-3-ketone be brominated, preferably by reaction with N-bromosuccimimide in mixture with chlorobenzene and carbon tetrachloride and under strong illumination, to form a 6-methyl-6-bromo-$\Delta^{1,4}$-3-ketone, which upon dehydrobromination give rise to the formation of the corresponding 6-methyl-$\Delta^{1,4,6}$-3-ketones. The dehydrobromination is effected by heating with calcium carbonate in mixture with dimethylacetamide, or by refluxing with with collidine.

The starting materials used in practicing the present process are partly known in the chemical literature, and partly disclosed and claimed in U.S. application Ser. No. 796,766, filed Mar. 3, 1955 and now abandoned, and in two additional applications, Ser. No. 825,660, now U.S. Pat. 3,201,429 and Ser. No. 825,661, now abandoned, filed as of even date herewith.

The following specific examples serve to illustrate, but are not intended to limit the present invention.

Example 1

A mixture of 5 g. of 6α-methyl-16α-hydroxy-cortisone 21-acetate, 10 g. of chloranil, 125 cc. of ethyl acetate and 24 cc. of acetic acid was refluxed for 55 hours under an atmosphere of nitrogen, cooled, and the solution was washed with 10% aqueous sodium hydroxide solution and with water, dried over anhydrous sodium sulfate and evaporated to dryness under reduced pressure. By chromatography of the residue on neutral alumina there was obtained 6-methyl-$\Delta^{4,6}$-pregnadiene-16α,17α,21-triol-3,11,20-trione 21-acetate.

A mixture of 3 g. of the above compound, 150 cc. of ter-butanol, 1.2 g. of selenium dioxide and a few drops of pyridine was refluxed for 48 hours under an atmosphere of nitrogen, filtered through celite and the filtrate was evaporated; the residue was dissolved in 50 cc. of acetone, refluxed for 1 hour with decolorizing charcoal, filtered and the acetone was evaporated. Chromatography on neutral alumina yielded 6-methyl-$\Delta^{1,4,6}$-pregnatriene-16α, 17α,21-triol-3,11,20-trione 21-acetate.

Example II

A mixture of 1 g. of 6β-methyl-16α-hydroxy-cortisone 21-acetate, 2 g. of chloranil, 25 cc. of amyl acetate and 5 cc. of acetic acid was refluxed for 20 hours and then the product was isolated as described in the previous example, thus affording the intermediate 6-methyl-$\Delta^{4,6}$-pregnadiene-16α,17α,21-triol-3,11,20-trione 21- acetate.

Saponifaction by the method of Example VII yielded 6 - methyl - $\Delta^{4,6}$ - pregnadiene - 16α,17α,21 - triol - 3,11, 20-trione.

Example III

A mixture of 3 g. of 6α-methyl-16α-hydroxy-cortisone 21-acetate, 5 g. of chloranil and 120 cc. of n-amyl alcohol was refluxed for 16 hours and the product was then isolated by essentially following the method described in Example IV. There was thus obtained 6-methyl-$\Delta^{1,4,6}$-pregnatriene-16α,17α-21-triol-3,11,20-trione 21-acetate.

Example IV

By the method of Example I, 6α,16α-dimethylhydrocortisone 21-acetate was converted into 6,16α-dimethyl-$\Delta^{4,6}$-pregnadiene-11β,17α,21-triol-3,20-dione 21 - acetate, which was in turn converted into 6,16α-dimethyl-$\Delta^{1,4,6}$-pregnatriene-11β,17α21-triol-3,20-dione 21-acetate.

By the chromic acid oxidation method of Example VI, the above $\Delta^{4,6}$- and $\Delta^{1,4,6}$-compounds were converted into 6,16α-dimethyl $\Delta^{4,6}$-pregnadiene-17α,21-diol-3,11,20 - trione 21-acetate and 6,16α-dimethyl-$\Delta^{1,4,6}$-pregnatriene-17α, 21-diol-3,11,20-trione 21-acetate, respectively.

The same reactions were carried out with the 16β-methyl compounds.

Example V

By the method of Example I, 6β,16β-dimethylcortisone 21-propionate was converted into 6.16β-dimethyl-6-dehydrocortisone 21-propionate and then into 6,16β-dimethyl-6-dehydro-prednisone 21-propionate.

Saponifaction by the method of Example VII yielded the free 21-alcohol.

Example VI

By the method of Example I, 6α,16β-dimethyl-prednisolone 21-propionate was converted into 6,16β-dimethyl-6-dehydro-prodnisolone 21-propionate. A solution of 1 g. of the latter in 50 cc. of acetic acid was treated, at room temperature, with a solution of 300 mg. of chromium trioxide in 20 cc. of 50% aqueous acetic acid; after 2 hours the mixture was poured into water, the precipitate was collected by filtration, washed with water, dried and recrystallized from acetone-hexane, thus producing 6,16β-dimethyl-6-dehydroprednisone 21-propionate, identical with the final compound of the previous example.

Example VII

By the method of Example I, the 16α,17α-acetonide 21-acetate of 6α-methyl-16α-hydroxy-cortisone was converted into the acetonide of 6-methyl-6-dehydro-16α-hydroxy-cortisone 21-acetate, which was then converted into the acetonide of 6-methyl-6-dehydro-16α-hydroxyprednisone 21-acetate.

1 g. of the above compound was treated with a 1% solution of potassium hydroxide and kept for 1 hour at a temperature around 0° C. The mixture was acidified with acetic acid, concentrated to a small volume and poured into water; the precipitate was collected, washed with water, dried and recrystallized from acetone-hexane, thus affording the acetonide of 6-methyl-6-dehydro-16α-hydroxyprednisone.

A mixture of 500 g. of the above compound and 50 cc. of 60% formic acid was refluxed for half an hour, cooled, diluted with 100 cc. of water and the precipitate formed was collected, washed with water, dried and recrystallized from acetone-hexane, thus yielding 6-methyl-6-dehydro-16α-hydroxyprednisone.

Example VIII

A solution of 3 g. of 6α,16α-dimethyl-9α-fluoro-prednisolone 21-acetate in 320 cc. of chlorobenzene and 360 cc. of carbon tetrachloride was treated with 4.2 cc. of pyridine and 800 mg. of powdered N-bromosuccimimide. The air was displaced with carbon dioxide and the mixture was illuminated with a 500 watt lamp, refluxed for 10 minutes, the mixture was cooled, filtered and the filtrate was washed with water to neutral, concentrated to a small volume under reduced pressure and chilled; the precipitate was collected and recrystallized from chloroform-hexane, thus producing 6,16α-dimethyl-6-bromo-9α-fluoro-prednisolone 21-acetate.

A solution of 3 g. of the above compound in 10 cc. of dimethylacetamide was added with vigorous stirring to a suspension of 1.5 g. of calcium carbonate in 30 cc. of dimethylacetamide which had been heated nearly to boiling. The mixture was refluxed for 15 minutes, sealed, poured into water, acidified with hydrochloric acids and the precipitate was collected by filtration, washed with water, dried and recrystallized from acetone-hexane, thus yielding 6,16α-dimethyl-5α-fluoro-$\Delta^{1,4,6}$-pregnatriene-11β, 17α-triol-3,20-dione 21-acetate, whose acetoxy group was hydrolyzed by the method of the preceding example, to yield 6,16α-dimethyl-9α-fluoro-$\Delta^{1,4,6}$-pregnatriene-11β,17α, 21-triol-3,20-dione.

A solution of 1 g. of the above compound in 10 cc. of pyridine was treated with 1 g. of benzoic anhydride overnight at room temperature, poured into water, heated on the steam bath for one hour and cooled. The precipitate was collected, washed with water, dried and recrystallized from acetone-hexane, thus giving 6,16α-dimethyl-9α-fluoro-$\Delta^{1,4,6}$-pregnatriene-11β-,17α,21-triol-3,20-dione 21-benzoate.

Example IX

In accordance with the method of Example I, 5 g. of 6α-methyl-9α-fluoro-16α-hydroxy-hydrocortisone 16,21-diacetate was treated with chloranil to produce 6-methyl-9α-fluoro-6-dehydro-16α-hydroxy-hydrocortisone 16,21-diacetate, whose acetoxy groups were hydrolyzed by treatment with dilute methanolic potassium hydroxide solution, as described in Example VII.

A solution of 3 g. of the thus obtained free 6-methyl-9α-fluoro-6-dehydro-16α-hydroxy-hydrocortisone in 200 cc. of benzene containing 10 g. of paraformaldehyde was treated under stirring with 5 drops of 70% perchloric acid and the mixture was kept for 2 hours at room temperature, washed with water to neutral and the benzene was evaporated. Chromatography of the residue on neutral alumina afforded 6-methyl-9α-fluoro-16α,17α-methylenedioxy-$\Delta^{4,6}$-pregnadiene-11β,21-diol-3,20-dione.

A solution of 2 g. of the above formaldehyde-acetal in 10 cc. of pyridine was treated with 4 g. of cyclopentyl-propionic anhydride, kept at room temperature for 2 days, diluted with water, heated on the steam bath for 1 hour, cooled and extracted with ethyl acetate. The extract was washed with water, dried over anhydrous sodium sulfate and the solvent was evaporated. By chromatography of the residue on neutral alumina there was obtained 6-methyl-9α-fluoro-16α,17α - methylenedioxy-Δ⁴,⁶-pregnadiene - 11β,21-diol-3,20-dione, 21-cyclopentylpropionate.

By refluxing 2 g. of the above compound with selenium dioxide, as described in Example I, there was obtained 6-methyl-9α-fluoro-16α,17α - methylenedioxy-Δ¹,⁴,⁶-pregnatriene-11β,21-diol-3,20-dione 21-cyclopentylpropionate.

*Example X*

By the method of Example 1, 6α-methyl-16α-hydroxyhydrocortisone 21-acetate was converted into 6-methyl-Δ⁴,⁶-prednadiene-11β,16α,17α,21-tetrol-3,20-dione 21-acetate and into 6-methyl-Δ¹,⁴,⁶-pregnatriene-11β,16α,17α,21-tetrol-3,20-dione 21-acetate.

I claim:

1. A compound of the following formula:

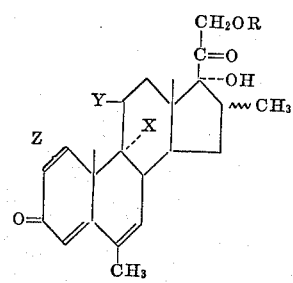

wherein R is selected from the group consisting of hydrogen and lower alkanoyl; Y is selected from the group consisting of β-hydroxy and keto; X is selected from the group consisting of hydrogen, fluorine and chlorine and Z is selected from the group consisting of a double bond between C-1 and C-2 and a saturated linkage between C-1 and C-2.

2. A compound of the formula:

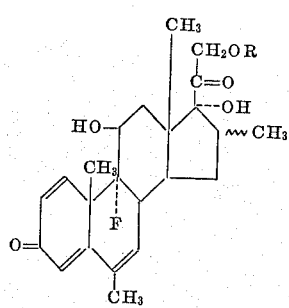

wherein R is selected from the group consisting of hydrogen and lower alkanoyl.

3. The C-16,21-hydrocarbon carboxylic acid esters of up to 12 carbon atoms of 6-methyl-9α-fluoro-Δ⁴,⁶-pregnadiene-11β,16α,17α,21-tetrol-3,20-dione.

4. The 21-hydrocarbon carboxylic acid esters of up to 12 carbon atoms of 6,16-dimethyl-9α-fluoro-Δ¹,⁴,⁶-pregnatriene-11β,17α,21-triol-3,20-dione.

5. 6,16-dimethyl-9α-fluoro - Δ¹,⁴,⁶-pregnatriene-11β,17α,21-triol-3,20-dione.

6. A compound of the following formula:

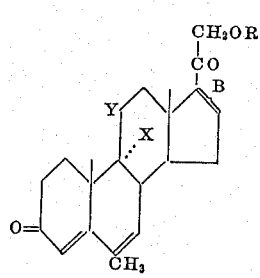

wherein X is selected from the group consisting of hydrogen, fluorine and chlorine; Y is selected from the group consisting of =O and

B is selected from the group consisting of 16α,17α-dihydroxy, 16α-acycloxy-17α-hydroxy and a cyclic ketal and acetal at C-16α,17α. R is selected from the group consisting of hydrogen and an acyl group; such acyl group may be a hydrocarbon carboxylic acid acyl group of up to 12 carbon atoms and it may be derived from sulfonic acids, phosphoric acid, sulfuric acid and from hydrogen halides.

7. 6-methyl-Δ⁴,⁶-pregnadiene - 16α,17α,21-triol-3,11,20-trione.

8. 6-methyl-Δ⁴,⁶-pregnadiene - 16α,17α,21-triol-3,11,20-trione 16,17-acetonide.

9. 6-methyl-Δ⁴,⁶-pregnadiene - 11β,16α,17α,21-tetrol, 3-20-dione.

10. 6-methyl-9α-fluoro-Δ⁴,⁶ - pregnadiene-11β,16α,17α-21-tetrol-3,20-dione.

11. The 21-hydrocarbon carboxylic acid esters of up to 12 carbon atoms of 6-methyl-9α-fluoro-Δ⁴,⁶-pregnadiene-11β,16α,17α,21-tetrol-3,20-dione.

12. A compound selected from the group consisting of the 16α,17α-acetals and ketals of 6-methyl-9α-fluoro-Δ⁴,⁶-pregnadiene-11β,16α,17α,21-tetrol-3,20-dione.

13. A compound of the following formula:

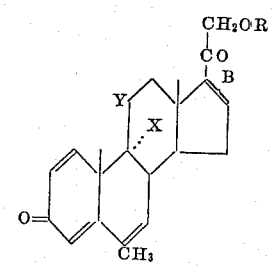

wherein X is selected from the group consisting of hydrogen, fluorine and chlorine; Y is selected from the group consisting of =O and

B is selected from the group consisting of a cyclic ketal and acetal at C-16α,17α, R is selected from the group consisting of hydrogen and an acyl group; such acyl group may be a hydrocarbon carboxylic acid acyl group of up to 12 carbon atoms and it may be derived from sulfonic acids, phosphoric acid, sulfuric acid and from hydrogen halides.

14. 6-methyl-Δ¹,⁴,⁶-pregnatriene - 16α,17α,21-triol-3,11,20-trione 16,17-acetonide.

15. 6-methyl-Δ¹,⁴,⁶-pregnatriene - 16α,17α,20-triol-3,11,20-trione 16,17-acetomide 21-acetate.

16. 6,16α-dimethyl-Δ⁴,⁶ - pregnadiene-17α,21-diol-3,11,20-trione.

17. 6,16β-dimethyl-Δ⁴,⁶ - pregnadiene-17α,21-diol-3,11,20-trione.

18. 6,16α-dimethyl-Δ⁴,⁶ - pregnadiene-11β,17α,21-triol-3,20-dione.

19. 6,16β-dimethyl-Δ⁴,⁶ - pregnadiene-11β,17α,21-triol-3,20-dione.

20. 6,16α-dimethyl - Δ¹,⁴,⁶ - pregnatriene-17α,21-diol-3,11,20-trione.

21. 6,16β-dimethyl - Δ¹,⁴,⁶ - pregnatriene-17α,21-diol-3,11,20-trione.

22. 6,16-dimethyl-Δ¹,⁴,⁶ - pregnatriene-11β,17α,21-triol-3,20-dione.

(References on following page)

References Cited by the Examiner

UNITED STATES PATENTS

| | | | |
|---|---|---|---|
| 2,789,118 | 4/1957 | Bernstein et al. | 260—397.45 |
| 2,806,043 | 9/1957 | Bernstein et al. | 260—397.45 |
| 2,814,631 | 11/1957 | Gould | 260—397.45 |
| 2,837,464 | 6/1958 | Nobile | 195—51 |
| 2,864,838 | 12/1958 | Lincoln et al. | 260—397.45 |
| 2,883,379 | 4/1959 | Moreland et al. | 260—239.55 |
| 2,894,008 | 7/1959 | Sollman | 260—397.47 |

OTHER REFERENCES

Fried et al., J. Am. Chem. Soc., vol. 80, No. 9 (May 5, 1958), pages 2338 and 2339.

ELBERT L. ROBERTS, *Primary Examiner.*

JULIUS FROME, LESLIE H. GASTON, MORRIS LIEBMAN, *Examiners.*

T. G. MORGAN, G. E. LANDE, HENRY A. FRENCH, *Assistant Examiners.*